United States Patent [19]

Rahtgen

[11] Patent Number: 4,882,779

[45] Date of Patent: Nov. 21, 1989

[54] APPARATUS FOR COMMUNICATING WITH DATA SYSTEMS AND A METHOD OF COMMUNICATING WITH DATA SYSTEMS

[75] Inventor: Preben Rahtgen, Vaerløse, Denmark

[73] Assignee: Pengeinstitutternes Kobe - og Kreditkortaktieselskab, Ballerup, Denmark

[21] Appl. No.: 256,239

[22] Filed: Oct. 11, 1988

Related U.S. Application Data

[63] Continuation of Ser. No. 827,930, filed as PCT DK85/00032 on Apr. 9, 1985, published as WO85/04742 on Oct. 24, 1985, abandoned.

[30] Foreign Application Priority Data

Apr. 12, 1984 [DK] Denmark .............................. 1907/84

[51] Int. Cl.⁴ .............................................. H04L 9/02
[52] U.S. Cl. .......................................... 380/24; 380/25
[58] Field of Search ...................................... 380/23-25

[56] References Cited

U.S. PATENT DOCUMENTS

| | | | |
|---|---|---|---|
| 3,941,977 | 3/1976 | Voss et al. | 235/379 |
| 3,956,615 | 3/1976 | Anderson et al. | 235/381 |
| 4,193,131 | 3/1980 | Lennon et al. | 380/23 |
| 4,219,151 | 8/1980 | Haruki | 235/379 |
| 4,304,990 | 12/1981 | Atalla | 380/24 |
| 4,438,824 | 3/1984 | Mueller-Schloer | 380/25 |
| 4,500,750 | 2/1985 | Elander et al. | 178/22.14 |
| 4,523,087 | 6/1985 | Benton | 235/379 |
| 4,593,384 | 6/1986 | Kleijne | 307/202.1 |
| 4,713,753 | 12/1987 | Boebert | 380/25 |

FOREIGN PATENT DOCUMENTS

| | | |
|---|---|---|
| 0003756 | 9/1979 | European Pat. Off. |
| 0033833 | 6/1981 | European Pat. Off. |
| 410129 | 9/1979 | Sweden |
| 412130 | 2/1980 | Sweden |
| 426886 | 2/1983 | Sweden |
| 2131586 | 6/1984 | United Kingdom |

Primary Examiner—Salvatore Cangialosi
Attorney, Agent, or Firm—Merchant, Gould, Smith, Edell, Welter & Schmidt

[57] ABSTRACT

An apparatus communicating with data systems, and a method of communicating with data systems. In an apparatus (10, 49) communicating with a high secrecy and high security on-line verification data system (40) and an off-line verification data system (18) of a lower secrecy and security level, a person in possession of a card (21, 22, 12, 24) inputs the card into the apparatus (10, 49). The data are read from the card and input to a security module (50) of the apparatus. On the basis of the data read from the card, the apparatus (10, 49) identifies the card as a card belonging to the on-line data system or the off-line data system. Within the security module (50) of the apparatus (10, 49), a keyboard (46) is arranged, which is adapted to be activated by the person in possession of the card for inputting a personal authentication code (actually a PIN-code) into the security module. Provided the card has been identified as a card belonging to the on-line data system (40), the data read from the card (21) and the code input by means of the keyboard (46) are encrypted by employed an encryption algorithm which is stored in a first storage means of the security module (50) and are output to the on-line data system (40), within which the authenticity of the person in possession of the card is verified. Provided the card has been identified as a card belonging to the data system of lower secrecy and security level (18), the data read from the card (22, 23, 24) are compared to the code input by means of the keyboard (46) by employing a verification algorithm, which is stored in a second storage means of the security module (50), in a comparator of the security module (50). As a result of the comparison within the comparator an authenticity code or, alternatively, a non-authenticity code is output to the off-line data system, exclusively. A coherent set of data and code is under no circumstances output from the apparatus to the data system of lower secrecy and security level. Consequently, the problem of eliminating transparency from the lower level secrecy and security data system to the high secrecy and high security data system is solved.

12 Claims, 5 Drawing Sheets

APPARATUS FOR COMMUNICATING WITH DATA SYSTEMS AND A METHOD OF COMMUNICATING WITH DATA SYSTEMS

This is a continuation of application Ser. No. 827,930, filed as PCT DK85/00032 on Apr. 9, 1985, published as WO85/04742 on Oct. 24, 1985, now abandoned.

BACKGROUND OF THE INVENTION

In the prior art, several apparatuses, systems etc. have been developed for identifying a cardholder or for verifying the cardholder's authenticity relative to a data system on the basis of data read from or originating from data read from the cardholder's card by a card reading terminal and on the basis of a code input by the cardholder and known by the legal cardholder exclusively.

Among these known systems, some carry out the authenticity verification on-line, while others carry out the authenticity verification off-line. In an on-line system, it is customary to encrypt the data read from or originating from the data read from the card and the code input by the cardholder, and to transmit the encrypted data and the encrypted code to a remote central processing unit. In the central processing unit, the encrypted data and the encrypted code are compared in an encrypted or in a de-encrypted state, to determine whether the cardholder, i.e. the person in possession of the card in question, is positively identified as the legal cardholder. In an off-line system, the data and the code are compared to one another in the card reading terminal, in an encrypted state or in a non-encrypted state for carrying out the positive identification of the cardholder relative to the card. After a positive identification of the cardholder, the system may allow a transaction of a sum of money to or from an account identified by the card and the cardholder, allow access for the cardholder to a carefully locked territory, region or zone, or dispense objects, articles, etc. to the cardholder in a predetermined amount, i.e. determined by the data of the card, or alternatively in an amount determined by the cardholder by input of a number corresponding to the amount in question.

The card may be an optically readable card, i.e. a card having light transparent and light intransparent areas, such as cards having transparent windows; it may be a mechanically readable card having mechanical data identifying means, e.g. punched areas; it may be a magnetic card having magnetic zones or magnetic strips in which the data are recorded; or it may be an active or electronic card having integral electronic storage means which are connected to the reading terminal through electronic connection means. Alternatively, the card may be a combined optically, mechanically, magnetically readable and electronic card. However, it has become customary to employ cards having magnetic strips arranged thereon together with a name or symbol identifying the card system or data system, such as cards conforming to among others the ISO Standard 2894 (International Organization of Standardization), also known as ISO cards.

As still more functions are automatied and still more card systems are issued, there is a need for an apparatus which renders it possible to identify different card or data systems and to provide communication to the correct data system. First of all, this need has a conveniency aspect as a person may purchase goods by means of several different machine readable cards, such as a card, conventionally a credit card, issued by the company or the firm in question, a credit card issued by a credit card organisation, such as a Diners Club Card, a Eurocard, etc., or a card such as a debit card, e.g. a card issued by a bank organisation, such as the "Dankort System". However, apart from the conveniency aspect of providing a single apparatus for reading cards issued by different card issuing organisations, a very important security aspect is also involved therein.

Basically, the different organisations or data systems have different levels of data secrecy and data security; as mentioned above, some data systems verify the authenticity of the cardholder or the person in possession of the card on-line, others carry out the verification off-line, while in some data systems, the verification is carried out semi-on-line in that the data are read from the card and output to a verification block together with the secret code input by the cardholder. Conventionally, this verification block is included in a so-called "back office computer". As the transmission from the card reading terminal to the back office computer or verification block may very easily be tapped, a coherent set of data and code, read from the card and input by the cardholder, respectively, may be tapped. Consequently, the person tapping the transmission may provide a false copy of the card and use this false copy as a legal card as the secret code has been exposed to him. Therefore, as some card and data systems involve high secrecy and high security, there is a risk that a high secrecy and high security card may inadvertently be presented to a low secrecy and low security terminal by the legal cardholder, who also inputs the secret code to this low secrecy and low security terminal which exposes the information, i.e. the data of the card and the secret code.

Apart from the above risk of inadvertently presenting the card data and the secret code known to the legal cardholder exclusively, a false or dummy terminal provided by a person who wants to tap coherent sets of data and code by means of the dummy terminal and having identifications corresponding to the high secrecy and high security card system could also expose the card data and the secret code, especially in cases where several card reading terminals of different organisations are arranged side by side.

It is believed that the provision of a single apparatus communicating with the different data systems is of the utmost importance for obtaining a high secrecy and high security level as the possibility of confusing the cardholder is minimized when the possibility of providing a trustworthy copy or dummy terminal is reduced.

However, a simple apparatus communicating with different data systems, for reading data from a data carrying card and for transmitting the data and the code input by the cardholder to the different data systems can in itself provide transparency to the high secrecy and high security data system from a low secrecy and low security data system as the apparatus very easily may be falsely controlled into a mode in which the data read from the high secrecy and high security card together with the corresponding code are output to a low security and low secrecy data system.

Therefore, there is a need for an apparatus communicating with more than one data system for obtaining the above discussed security advantages offered by a combined apparatus, however, still eliminating the risk of providing transparency to a high security and high secrecy data system from a low secrecy and low security data system.

SUMMARY OF THE INVENTION

This need is fulfilled by an apparatus according to a first aspect of the invention and communicating with at least two different data systems, for receiving data originating from data read from a data carrying card, for receiving a card identifying signal positively identifying the card as a card belonging to a first data system, or alternatively, as a card belonging to a second data system, and for transmitting the data originating from the data read from the card to a first of said data systems, or alternatively, for verifying the authenticity of a person in possession of the card relative to a second of said data systems, comprising:

a data input means for receiving the data originating from the data read from the card and for receiving the card identifying signal, an input means for input of a personal authentication code, a first storage means for storing a first encryption algorithm and a transmission protocol, a second storage means for storing a verification algorithm, an encryption means, controlled by the data input means and the first storage means, for encryption of the data and the code, so that, provided the card is identified as a card belonging to the first data system, the data originating from the data read from the card and the code are encrypted by employing the first encryption algorithm stored in the first storage means, and are output to the first data system controlled by the transmission protocol stored in the first storage means, and a comparator means, controlled by the data input means and the second storage means, for comparing the data originating from the data read from the card and the code, so that, provided the card is identified as a card belonging to the second data system, an authenticity code is supplied to the second data system in case the data originating from the data read from the card are verified in relation to the code by employing the verification algorithm stored in the second storage means, or alternatively, a non-authenticity code is supplied to the second data system in case the data originating from the data read from the card are not verified in relation to the code by employing the verification algorithm stored in the second storage means.

The concept of the present invention eliminates the risk of providing transparency to the first data system or the high secrecy and high security data system from the second data system or the low secrecy and low security data system, as, on the one hand, regarding the first data system, i.e. the high secrecy and high security data system, the personal authentication code is output to the first data system, in an encrypted state exclusively, which in itself guarantees the high security and high secrecy level, and on the other hand, regarding the second data system, i.e. the low secrecy and low security data system, the personal authentication code is compared to the data originating from the data read from the card exclusively in the comparator means, and the code input by means of the input means is under no circumstances output to the second data system, as the authenticity code or the non-authenticity code is ouput thereto exclusively. Furthermore, a coherent set of data originating from the data read from the card and code is under no circumstances output to the second data system.

In the present context, the expression "data originating from the data read from a card" means the data themselves read from the card or any offset or processed version of the data read from the card. Thus, the data which are received by the data input means of the apparatus according to the invention may constitute the data themselves read from the card or any offset or processed version of the data read from the card.

In accordance with a first embodiment of the invention, the apparatus may comprise a further encryption means, a second encryption algorithm further being stored in the second storage means, and the further encryption means being controlled by the data input means and the second storage means, so that, provided the card is identified as a card belonging to the second data system, the data originating from the data read from the card and the code are encrypted in the further encryption means by employing the second encryption algorithm stored in the second storage means prior to the comparison of the data and the code in the comparator means.

As an individual encryption means is employed for encrypting the data originating from the data read from the card and the code in relation to the first data system, and as the data and the code are further encrypted by employing a respective encryption algorithm prior to the verification in relation to the second data system, the intransparency is further increased, since the possibility of breaking the encryption code of the first data system, based on knowledge of the encryption and verification procedure involved in verifying the authenticity of the person in possession of the card in relation to the second data system, is elminated.

In accordance with the teachings of the present invention, the apparatus may further be adapted to communicate with three or more data systems without providing transparency to the high security and high secrecy data system from the low secrecy and low security data systems. In this embodiment of the invention, the apparatus further comprises a third storage means for storing a further verification algorithm, the card identifying signal further positively identifying the card as a card belonging to one of said three or more data systems, and the comparator means further being controlled by the data input means and the third storage means, for comparing the data originating from the data read from the card and the code, so that, provided the card is identified as a card belonging to the third data system, an authenticity code is supplied to the third data system in case the data originating from the data read from the card are verified in relation to the code by employing the verification algorithm stored in the third storage means, or alternatively, a non-authenticity code is supplied to the third data system in case data originating from the data read from the card are not verified in relation to the code by employing the verification algorithm stored in the third storage means.

In this embodiment of the invention, in which the apparatus communicates with three or more data systems, the security or secrecy level may be further increased, as explained above, in an embodiment, in which the apparatus comprises a still further encryption means, a third encryption algorithm further being stored in the third storage means, the still further encryption means being controlled by the data input means and the third storage means, so that, provided the card is identified as a card belonging to the third data system, the data originating from the data read from the card and the code are encrypted in the still further encryption means by employing the third encryption algorithm stored in the third storage means prior to the comparison of the data and the code in the comparator means.

In the above described embodiment of the invention, in which the data originating from the data read from the card and the code input by means of the input means are encrypted prior to the comparison of the data and the code in the comparator means, provided the card is identified as a card belonging to the second data system, or as a card belonging to the third data system, the encryption means comprising the first mentioned encryption means, the further encryption means and the still further encryption means may be constituted by discrete or individual encryption means implemented by software or hardware. However, the incryption means, i.e. the first encryption means, the further encryption means and the still further encryption means, may be constituted by a single encryption means.

Apart from the need of providing an apparatus communicating with at least two different data systems which eliminate the risk of providing transparency to the high security and high secrecy data system from the low secrecy and low security data system, there is a need for an apparatus communicating with at least two high security and high secrecy data systems which eliminates the possibility of obtaining transparency to one of the data systems from the other.

This need is fulfilled by an apparatus according to a second aspect of the present invention and communicating with at least two different data systems, for receiving data originating from data read from a data carrying card, for receiving a card identifying signal positively identifying the card as a card belonging to a first data system, or alternatively, as a card belonging to a second data system, and for transmitting the data originating from the data read from the card to a first of said data systems, or alternatively, to a second of said data systems, comprising:

a data input means for receiving the data originating from the data read from the card and for receiving the card identifying signal, an input means for input of a personal authentication code, a first storage means for storing a first encryption algorithm and a first transmission protocol, a second storage means for storing a second encryption algorithm and a second transmission protocol and, an encryption means for encryption of the data originating from the data read from the card and the code, the encryption being controlled by the data input means and a respective of the first and second storage means, so that, provided the card is identified as a card belonging to the first data system, the data originating from the data read from the card and the code are encrypted by employing the first encryption algorithm stored in the first storage means, and are output to the first data system controlled by the first transmission protocol stored in the first storage means, or alternatively, provided the card is identified as a card belonging to the second data system, the data originating from the data read from the card and the code are encrypted by employing the second encryption algorithm stored in the second storage means, and are output to the second data system controlled by the second transmission protocol stored in the second storage means.

As the coherent set of data originating from the data read from the card and personal authentication code is output to a respective data system in an encrypted state which in itself guarantees the high secrecy and high security level of the data system in question, an erroneous output of a coherent set of data and code to an erroneous data system does not expose the personal authentication code to a third party, however, the coherent set of data and code of the one of the data systems is exposed to the other data system, in case the coherent set of data and code of one of the data systems is erroneously output to the other data system. Therefore, in this aspect of the present invention, the data systems are transparent to one another and also dependent on one another as the secrecy and security level of one of the data systems is dependent on the other.

As in accordance with the first aspect of the present invention the security or secrecy level may be further increased in an embodiment comprising a further encryption means, a first of said encryption means being controlled by the data input means and the first storage means, so that, provided the card is identified as a card belonging to the first data system, the data originating from the data read from the card and the code are encrypted in the said first encryption means, and a second of said encryption means being controlled by the data input means and the second storage means, so that, provided the card is identified as a card belonging to the second data system, the data originating from the data read from the card and the code are encrypted in the said second encryption means.

In accordance with the teachings of the present invention, the apparatus may further be adapted to communicate with three or more data systems, and further comprising a third storage means for storing a third encryption algorithm and a third transmission protocol, the card identifying signal further positively identifying the card as a card belonging to one of said three or more data systems, and the encryption means further bieng controlled by the third storage means, so that, provided the card is identified as a card belonging to the third data system, the data originating from the data read from the card and the code are encrypted by employing the third encryption algorithm stored in the third storage means, and are output to the third data system controlled by the third transmission protocol stored in the third storage means.

As explained above, the intransparency is increased, provided an individual encryption means is employed in connection with the individual data systems. Therefore, the apparatus communicating with three or more data systems may further comprise a third encryption means, the third encryption means being controlled by the data input means and the third storage means, so that, provided the card is identified as a card belonging to the third data system, the data originating from the data read from the card and the code are encrypted in the third encryption means.

Apart from an apparatus communicating with three or more high security and high secrecy data systems, an apparatus, combining the teachings of the above aspects of the present invention, may be provided, i.e. an apparatus communicating with at least two high security and high secrecy data systems and one or more low secrecy and low security data systems and further comprising a third storage means for storing a verification algorithm, and a comparator means, the card identifying signal further positively identifying the card as a card belonging to one of the three or more data systems, and the comparator means being controlled by the data input means and, the third storage means, for comparing the data originating from the data read from the card and the code, so that, provided the card is identified as a card belonging to the third data system an authenticity code is supplied to the third data system in case the data originating from the data read from the card are verified in relation to the code by employing the verification algorithm stored in the third storage means, or alternatively, a non-authenticity code is supplied to the third data system in case the data originating from the data read from the card are not verified in relation to the code by employing the verification algorithm stored in the third storage means.

In the above embodiments of the invention of an apparatus communcating with three or more data systems, the apparatus may, as explained above, advantageously comprise a third encryption means, a third encryption algorithm further being stored in the third storage means, the third encryption means being controlled by the data input means and the third storage means, so that, provided the card is identified as a card belonging to the third data system, the data originating from the data read from the card and the code are encrypted in the third encryption means by employing the third encryption algorithm stored in the third storage means prior to the comparison of the data and the code in the comparator means.

The embodiments of the invention described above may further comprise an identifying means for receiving the data originating from the data read from the data carrying card, and for generating the card identifying signal positively identifying the card as a card belonging to a respective of the data systems or as a card belonging to neither of the data systems. As the apparatus in accordance with this embodiment of the invention generates the card identifying signal on the basis of the data read from the card, the possibility of controlling the apparatus into a mode, in which the data and a coherent code are encrypted by employing an erroneous encryption algorithm or an erroneous encryption means, is reduced.

Alternatively, the embodiments of the invention described above may in the place of the identifying means comprise a simple manually operable switching means, which is simply activated by the person in possession of the card, who is about to input a personal authentication code into the apparatus. Although the person, by erroneously activating the switching means, may turn the apparus into a mode, in which the data read from the card and the code input by the person are processed as if the data and the code belong to the low security and low secrecy data system, although the data and the code actually belong to the high security and high secrecy data system, a coherent set of data and code is under no circumstances exposed by the low secrecy and low security data system as the apparatus according to the invention supplies a non-authenticity code, or alternatively, under extreme and highly improbable conditions, an authenticity code to the low security and low secrecy data system.

In a further embodiment of the apparatus according to the invention, comprising an integral identifying means, a reading means for reading the data from the data carrying card is further included. Consequently, a self-contained apparatus for reading the data from the data carrying card and for transmitting the data and/or verifying the authenticity of the person in possession of the card has been provided.

In accordance with the preferred embodiments of the apparatus according to the invention, a temporary storage means is provided for temporarily storing the data read from the card and the personal authentication code, until the conclusion of the transmission of data from the apparatus of the data systems or the conclusion of the verification of the authenticity of the person in possession of the card.

In order to render it possible to have the apparatus according to the invention receive a reply from the said first data system, the reply constituting a authenticity verification or a non-authenticity verification as the result of the verification procedure carried out in the central processing unit of the said first data system, the apparatus according to the invention may further comprise a data receiving means for receiving data from the data systems.

Furthermore, the apparatus according to the invention may comprise a random number generator means, a random number generated by the random number generator means being stored in the temporary storage means and input to the encryption means together with the data to be encrypted therein and further being output to the said first data system together with the data output thereto. By combining a random number, the data and the code and further encrypting the combination, the possibility of breaking the encryption code is further reduced as the randomly generated number obviously alters the encrypted data in an unpredictable manner.

In an on-line verification system, an authenticity code is normally, as explained above, transmitted from the central processing unit of the data system to the apparatus or terminal after the central processing unit has concluded the on-line verification. In the above embodiment of the apparatus according to the invention including the random number generator means, a further comparator means for comparing the data transmitted thereto from the said first data system and the random number stored in the temporary storage means may be provided. In this embodiment, the authenticity code transmitted from the central processing unit of the on-line verification data system is constituted by the random number which has been transmitted to the central processing unit together with the data and the code in an encrypted state. As the authenticity code is constituted by the random number which is obviously altered randomly, the transmission of the authenticity or non-authenticity code to the apparatus from the central processing unit of the data system may be carried out in plain text, i.e. in a non-encrypted state.

In order to render it impossible to tap the apparatus, i.e. to eliminate the possibility of providing an output of codes and data by means of highly sensitive electronic listening equipment, and further eliminate the possibility of exposing details of the apparatus regarding the construction and the functions thereof and data, such as the temporarily stored random number generated by the random number generator means and the personal authentication code, stored therein, by exposing the apparatus to radiomagnetic radiation, especially X-rays and/or by demounting the entire apparatus, it is preferred that the apparatus according to the invention comprises a radiopaque, tamper- and tappingproof housing enclosing in the above first and second aspects of the present invention at least the data input means, the input means, the storage means, the encryption means, the comparator means, the temporary storage means, the further comparator means and the random number generator means and the data input means, the input means, the storage means, the encryption means, the temporary storage means, the further comparator means and the random number generator means respectively. The radiopaque, tamper-and tappingproof housing may, as is well known in the art, be provided by a housing comprising radiopaque component, magnetic and electric shielding components, and mechanical high-strength components, such as lead and stainless steel plates. For providing a tamperproof housing, a casting may be provided encasing the electronic components of the apparatus within the housing, and the casting may comprise high strengh elements such as ceramic or metallic particles or strips, which, when exposed to mechanical treatment, ruins the casting and disconnects and destroys vital parts of the apparatus, such as the storage means. Furthermore, the radiopaque, tamper- and tapping-proof housing may include light, vibration and/or shock detecting sensors, which, as is well known in the art, erases the storage means when exposed to light, vibrations or shocks.

Although the encryption means may be adapted to carry out any encryption algorithm involving secret or public keys, such as a PKC algorithm (public-key cryptography), in which a public key is employed for encryption and a secret key is employed for decrypting the encrypted data and the encrypted code, it is presently preferred that the encryption means are adapted to carry out the DES encryption and the respective storage means comprise a respective DES encryption key (DES: data encryption standard). DES is a NBS (National Bureau of Standards) approved encryption algorithm consisting of an initial permutation, 16 identical partial algorithms named rounds, a swopping of the left hand and the right-hand halves to ease decryption, and an inverse initial permutation. In each round a 64 bit word is substituted by another 64 bit number controlled by a 48 bit key which is further derived from an original 56 bit key. The DES encryption provides a high level of secrecy and security and has been implemented in hardware.

The input means of the apparatus which are adapted to input the personal authentication code may be of any appropriate kind, however, preferably of a kind which provides secrecy to the step of inputting the secret personal authentication code. The input means may be an optical reading means which is adapted to read a person's finger print or other biological characteristics and to transform this optically or otherwise readable information into a code. However, in the presently preferred embodiment of the invention, the input means is a keyboard, such as a numeric keyboard, an alphanumeric keyboard or an hexadecimal keyboard for input of a personal identification code (PIN) having any appropriate number of digits or characters or any combination thereof. In the presently preferred embodiment, the personal identification number is a decimal number comprising four digits.

Normally, the transmission of the data and the code in an encrypted state to the data system is a first step in an on-line verification of the cardholder's authenticity relative to the data system in question and relative to the card, whereafter a sum of money is transferred to or from the authorized cardholder's account. The number indicating the sum of money has to be input to the apparatus and further transmitted to the data system in question. The number indicating the sum of money is, however, preferably input from a further input means to the encryption means together with the data to be encrypted therein and are output to the respective data system together with the data output thereto. By providing an individual or further input means for input of the number to the encryption means instead of inputting the number by means of the numeric keyboard of the apparatus, a further secrecy and security advantage is obtained as the numeric keyboard is reserved for the input of the personal authentication code or personal identification number exclusively. Consequently, the risk of inadvertently exposing the personal authentication code to a third party by inadvertently inputting the personal authentication code instead of the sum of money which, as is well known in the art, is displayed to the person by a display means, is reduced, as the input means for inputting the sum of money into the apparatus, is separated from the input means for inputting the personal authentication code into the apparatus. Normally, the individual or further input means for receiving the number indicating the sum of money to be transferred, is connected to an external apparatus such as a cash register, which provides the number.

In the presently preferred embodiment of the invention, the apparatus further comprises a control means for controlling the overall function of the apparatus. By providing a controlling means, it is rendered possible to control the function of the apparatus autonomously so that in case a minor routine or function of the apparatus is ruined or malfunctioning, the apparatus is turned down, thus eliminating the possibility of erroneously transmitting data and codes to an erroneous data system and/or in an erroneous state, e.g. in a non-encrypted state.

The control means may advantageously be a microprocessor means which renders it possible to carry out a great number of check and control routines, such as controlling or checking the internal software of the apparatus and thus contains a high control complexity.

In the above embodiments of the invention, the storage means may be constituted by PROMs (programmable read only memories) or constituted by ROMs (read only memories), and the temporary storage means may advantageously be constituted by a RAM (random access memory), which is very easily erased in case an intrusion is attempted, as discussed above.

In the above described self-contained apparatus comprising the identifying means and reading means, the reading means may advantageously be a magnetic card reading means comprising a magnetic head assembly. In this embodiment of the invention, the apparatus is adapted to receive and read data from conventional magnetic cards.

In accordance with a third aspect, the present invention provides a method of communicating with at least two different data systems, of receiving data originating from data read from a data carrying card and of transmitting the data originating from the data read from the card to a first of said data systems, or alternatively, of verifying the authenticity of a person in possession of the card relative to a second of said data systems, comprising:

receiving the data originating from the data read by means of a reading means from the card, identifying the card on the basis of the data received from the reading means, as a card belonging to the first data system, as a card belonging to the second data system, or as a card belonging to neither of the data systems, inputting a personal authentication code, encrypting the data originating from the data read from the card and the code, provided the card is identified as a card belonging to the first data system, the data originating from the data read from the card and the code being encrypted by employing an encryption algorithm, and being output to the first data system controlled by a transmission protocol, and comparing the data originating from the data read from the card and the code, provided the card is identified as a card belonging to the second data system, an authenticity code being supplied to the second data system in case the data originating from the data read from the card are verified in relation to the code by employing a verification algorithm, or alternatively, a non-authenticity code being supplied to the second data system in case the data originating from the data read from the card are not verified in relation to the code by employing the verification algorithm.

In accordance with a fourth aspect, the present invention provides a method of communicating with at least two different data systems, of receiving data originating from data read from a data carrying card and of transmitting the data originating from the data read from the card to a first of said data systems, or alternatively, of transmitting the data to a second of said data systems, comprising:

reading the data from the card by means of a reading means, identifying the card on the basis of the data received from the reading means, as a card belonging to the first data system, as a card belonging to the second data system, or as a card belonging to neither of the data systems, inputting a personal authentication code, and encrypting the data originating from the data read from the card and the code, so that, provided the card is identified as a card belonging to the first data system, the data originating from the data read from the card and the code are encrypted by employing a first encryption algorithm, and are output to the first data system controlled by a first transmission protocol, or alternatively, so that, provided the card is identified as a card belonging to the second data system, the data originating from the data read from the card and the code are encrypted by employing a second encryption algorithm, and are output to the second data system controlled by a second transmission protocol.

BRIEF DESCRIPTION OF THE DRAWING

The invention will now be further described with reference to the drawing, wherein.

DETAILED DESCRIPTION OF THE DRAWING

Figure 3:
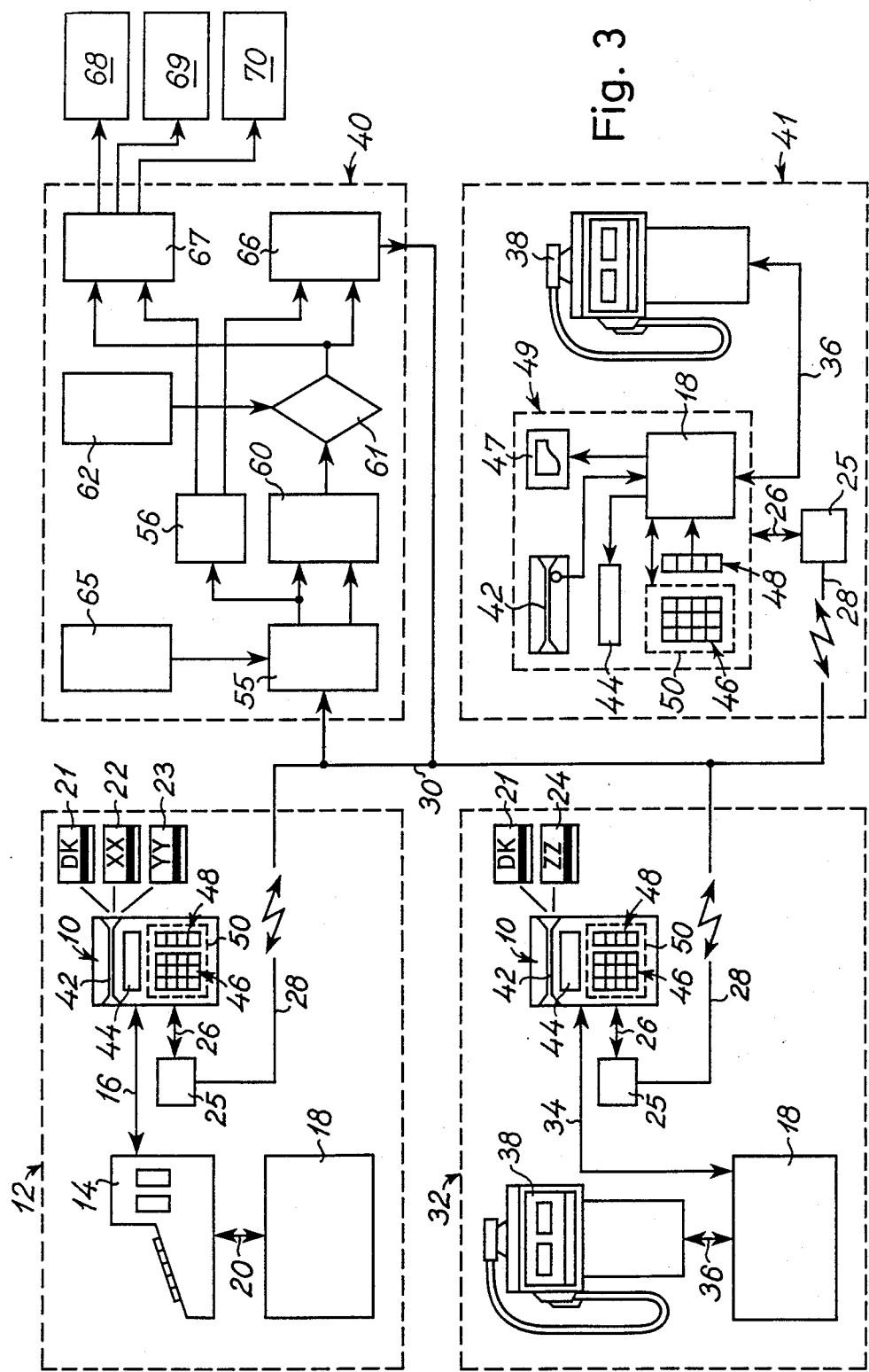
FIG. 3 is an overall, diagrammatical view of three different applications of an apparatus according to the invention.

In the left-hand side of FIG. 3, two different applications of an apparatus 10 according to the invention are shown, and in the right-hand side of FIG. 3 a third application of an alternative embodiment or implementation of an apparatus according to the invention is shown together with a high secrecy and high security, on-line verification data system, illustrated by the broken line block, designated 40. In its first application shown within a broken line block 12, the apparatus 10 communicates with a conventional cash register 14 through a two-way data transmission line 16. The cash register 14 further communicates with a so-called back office computer 18 through a data transmission line 20. In the back office computer 18, the transactions of the cash register 14 together with the transactions of other case registers, corresponding to the cash register 14 shown in FIG. 3, are registered. The back office computer 18 and the individual cash registers 14 may together constitute an on-line, an off-line or a semi-on-line data system, as is well known within the business computer field.

The apparatus 10 is adapted to receive magnetic, machine readable cards issued by different card issuing organisations. In the upper right corner of the block 12, three cards designated 21, 22 and 23, respectively, are shown illustrating cards issued by three different card issuing organisations, DK, XX and YY, respectively. The DK-card designated 21 is a card belonging to the high secrecy and high security, on-line verification data system 40, and the XX-card designated 22 is a card issued by a company and comprising the cash register 14 and the back office computer 18. The YY-card designated 23 may be a card issued by a credit card issuing organisation such as a Diner's Club Card, a Eurocard or the like, or a card issued by a firm basically corresponding to the firm issuing the XX-card designated 22. Alternatively, the YY-card designated 23 may correspond to the DK-card designated 21, i.e. the card 23 belongs to a high secrecy and high security, on-line data system, basically identical to the data system 40 shown in FIG. 3.

The apparatus 10 is connected to the data system 40 through a box 25 which includes a main supply section, which also supplies power to the apparatus 10, and a modem (modulator/demodulator). Apart from supplying power to the apparatus 10, the box 25 communicates with the apparatus 10 through a two-way data transmission line designated 26 (duplex or half-duplex transmission). The box 25 is connected to the data system 40 through a data transmission line 28, such as a public telephone line, which is connected to a data transmission network 30 through an interface, not shown on the drawing, in which the asynchronous transmission from the modem 25 and the apparatus 10 is compiled into a synchronous duplex transmission (transmission protocol X21).

In the lower part of the left-hand side of FIG. 3, a second application of the apparatus 10 is shown within a broken line block 32. As in the first application, shown within the broken line block 12, the apparatus 10 communicates through the data transmission line 26, the box 25, the telephone line 28, and the transmission network 30 with the high secrecy and high security, on-line verification, data system 40 shown in the upper part of the right-hand side of FIG. 3. Through a data transmission line 34, the apparatus 10 further communicates with the back office computer 18, which is further, through a data transmission line 36 connected to a roadside petrol pump 38. Apart from the DK-card 21, the apparatus 10 is adapted to receiving a ZZ-card designated 24. The ZZ-card 24 is a card issued by the petrol company running the filling station, the road-side petrol pump 38, and the back office computer 18.

The apparatus 10, which will be described in greater detail below with reference to FIGS. 1, 4, 6 and 7, comprises a slot 42 for receiving one of the cards 21-24, a display 44, and a numeric keyboard 46 included in a security module 50 together with four control keys designated by the reference numeral 48.

In the lower part of the right-hand side of FIG. 3, a third application of an apparatus implemented in an alternative embodiment of the invention is shown within a broken line block 41. As in the above described second application shown within the broken line block 32, the apparatus according to the invention which is shown within a broken line block 49 communicates with the high secrecy and high security, on-line verification data system 40 shown in the upper part of the right-hand side of FIG. 3 through the data transmission line 26, the box 25, the telephone line 28 and the transmission network 30. Through the data transmission line 36, the apparatus 49 communicates with the road-side petrol pump 38. Basically, the apparatus 49 includes the security module 50, which communicates with the back office computer 18. The above described four control keys designated by the reference numeral 48 are also included in the apparatus 49 and communicate with the back office computer 18. The display 44 and the card receiving slot 42 of a card reader also communicate with the back office computer 18 which also communicates with a receipt printer 47. The apparatus 49, which will be described in greater detail below with reference to FIGS. 5, 6 and 7, may be housed in a roadside post, which may further be adapted to receive notes or bills for payment of the petrol purchased. It is to be mentioned that the apparatus 49 shown in the lower part of the right-hand side of FIG. 3 may be modified into an an apparatus in which one or more of the individual components are located remotely. Thus, the back office computer 18 may alternatively be a computer of the type shown in the lower part of the left-hand side of FIG. 3. However, the concept of the present invention renders it possible to provide an apparatus communicating with a high secrecy and high security, on-line data system and a low secrecy and low security data system such as a petrol company data system comprising the back office computer 18 in which the data read from the card, e.g. one of the cards 22, 23 or 24, are processed within the back office computer 18 prior to the presentation of the data or any offset thereof to the security module 50 in which the data originating from the data read from the card, i.e. the data themselves or any offset thereof supplied from the back office computer 18, are compared to a PIN-code, which is input by means of the numeric keyboard 46 by the customer or the person in possession of the card in question, as will be described below.

In the first application shown within the broken line block 12, a cash register operator inputs the individual prices for the individual goods to be purchased by the customer into the cash register 14. After having input all the prices into the cash register, the cash register operator makes the cash register calculate the total sum, which is output through the data transmission line 20 to the back office computer 18, and which is also output through the data transmission line 16 to the apparatus 10, and displayed on the display 44 thereof. While the cash register operator is inputting the prices into the cash register 14, the person in possession of a card 21, 22 or 23 moves the magnetic card through the card receiving slot 42 of the apparatus 10. By this, the data stored on the card is input into the apparatus. From these data, a card identifying data or card identifying signal is derived, which identifies the card as a DK-card, an XX-card, a YY-card, or a card belonging to neither of these categories, which are acceptable to the apparatus 10. The customer also inputs the above mentioned personal identification number (a PIN-code) into the apparatus, i.e. into the security module 50, by means of the keyboard 46. This PIN-code is a secret code, which is known to the customer exclusively.

Provided that the actual card is an XX-card, i.e. a card issued by the company in question, the apparatus 10 carries out, as will be explained below, an off-line verification of the authenticity of the person in possession of the card relative to the card and, consequently, relative to the firm or the data system, i.e. the back office computer 18. In case the authenticity of the cusstomer or the peson in possession of the XX-card 22 is verified, the apparatus 10 outputs an authenticity code to the cash register 14 through the data transmission line 16 and further through the data transmission line 20 to the back office computer 18. As the customer has been identified as a legal and authorized cardholder, the sum calculated in the cash register 14 will now be transferred to the back office computer 18 and debited the customer's account. First, the customer is, however, to accept the sum displayed on the display 44 by activating an appropriate key among the keys 48, as will be explained below. In case the authenticity of the person in possession of the XX-card 22 is not verified, the apparatus 10 outputs a non-authenticity code through the data transmission line 16, to the cash register 14. In this case, the customer is not allowed to purchase the goods by transferring the sum to the back office computer 18 and registrating the sum in the account corresponding to the actual card 22.

In the second and third applications of the apparatus 10 and the apparatus 49, respectively, shown within the broken line block 32 in the lower left-hand side of FIG. 3 and within the broken line block 41 in the lower right-hand side of FIG. 3, respectively, the authenticity of the person in possession of the card has to be verified relative to the back office computer system including the back office computer 18, when the person employs the ZZ-card 24, or relative to the on-line verification data system shown in the upper right-hand side of FIG. 3 within the broken line block 40 when the person employs the DK-card 21 before the petrol pump 38 is turned on. In this off-line or on-line verification, a zero default value of the sum of money, corresponding to the quantity of petrol to be purchased is employed. Provided the authenticity of the person in possession of the card has been verified relative to the data system corresponding to the data card, the person may purchase petrol and/or other goods, the prices of which are registered by means of a cash register function not shown on the drawing, however, basically corresponding to the above cash register 14 communicating with the back office computer 18.

In case the customer employs the DK-card 21 in the applications shown within the broken line blocks 12, 32 and 41, the data read from the card are presented to the security module 50 and encrypted therein together with the sum input to the apparatus from the cash register 14 and the PIN-code input by the customer by means of the numeric keyboard 46 as will be explained in greater detail below, with reference to FIG. 7, and output in an encrypted state to the box 25 and further transmitted through the public telephone line 28, the above mentioned data compiled, not shown on the drawing, through the transmission network 30 and input to the on-line verification data system shown in the upper part of the right-hand side of FIG. 3 within the broken line block 40.

Figure 7:
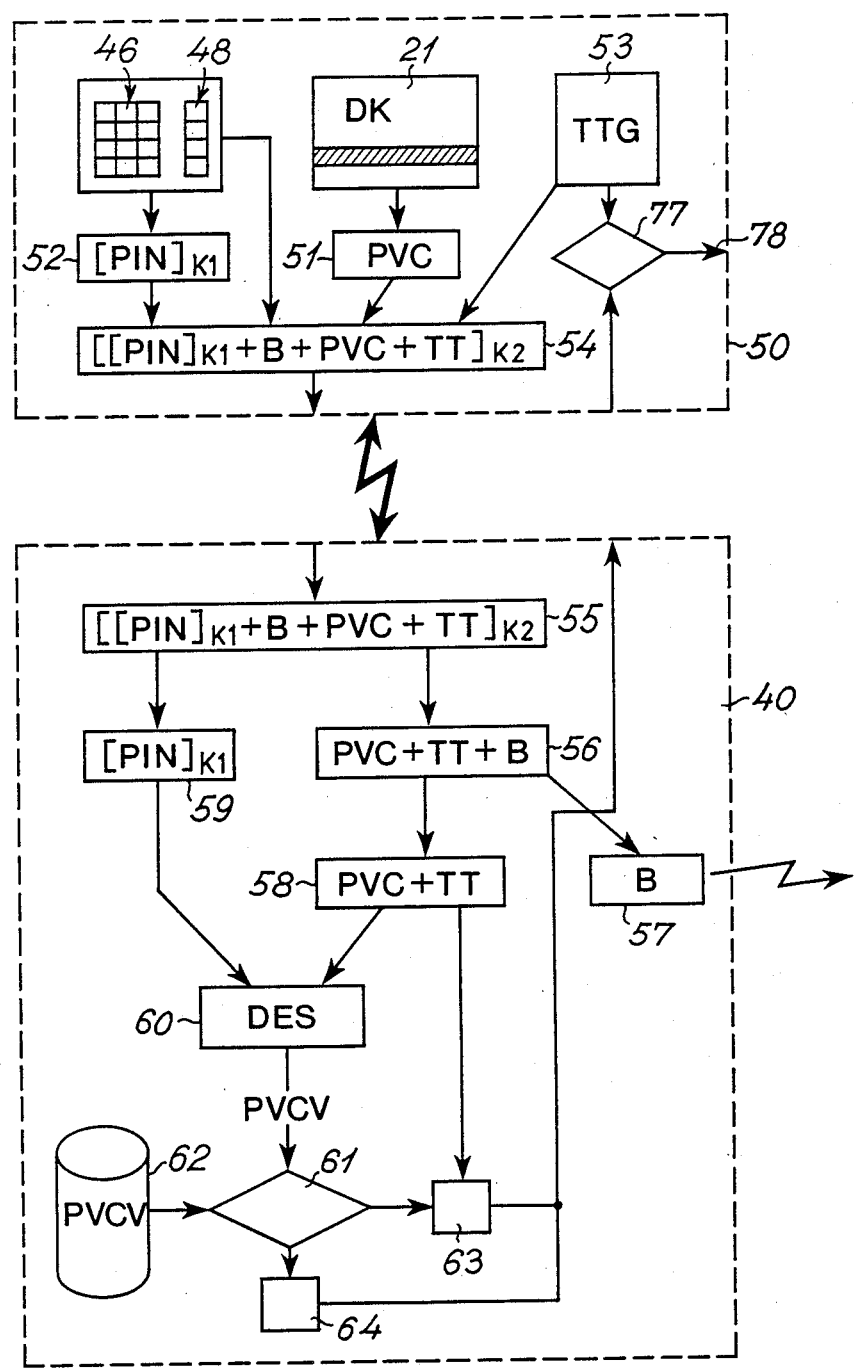
FIG. 7 is a diagrammatical view illustrating the high secrecy and high security encryption and decryption in an on-line data system.

Now turning to FIG. 7, the security module 50 of the apparatus 10 and the apparatus 49 according to the invention is shown in the upper part of FIG. 7, and the broken line 40 illustrates the high security and high secrecy, on-line verification data system, shown in the lower part of FIG. 7, Basically, FIG. 7 illustrates encryption routine carried out in the security module 50 prior to transmitting data therefrom to the data system 40 in which a decryption routine for verifying the authenticity of the person in possession of the DK-card 21 is carried out. As mentioned above, the DK-card 21 includes card identifying data and, furthermore, a personal verification code (PVC). In a block 51, viz. the card reading means of the apparatus, the PVC-code and the card identifying data are provided from the card. The person in possession of the card inputs a PIN-code, as mentioned above, by means of the numeric keyboard 46. The PIN-code is input to an encryption block 52, in which the PIN-code is encrypted by employing a first encryption key $K_1$. As the person activates the above control keys designated 48, the total sum B is transferred, provided the customer has already accepted the total sum, if not, the above mentioned zero default value of the total sum B is transferred. In a random number generator 53, a random number TT is generated. The random number TT, the PVC-code, provided from the block 51, the total sum B transferred from the control keys 48, and the encrypted PIN-code [PIN] $K_1$ generated in the block 52, is input to a second encryption block 54 and are encrypted by employing a second encryption key $K_2$. As the security module 50 is a single module among a plurality of modules communicating with one and the same on-line data system, a security module identifying number is transmitted from the block 59 of the module 50 in plain text together with the second encryption key version of the encrypted PIN-code [PIN] $K_1$, the total number B, the PVC-code, and the random number TT, i.e. [[PIN] $K_1$+B+PVC+TT] $K_2$.

As explained above, the PVC-code, the PIN-code, the total sum B and the random number TT are in an encrypted state output from the apparatus 10 to the box 25 and are through the public telephone line 28, through the data compiler, not shown on the drawing, and through the data transmission network 30 input to the high secrecy and high security, on-line verification data system 40. In a first block 55 of the data system, the data are decrypted by employing a decryption key corresponding to the encryption key $K_2$. The random number TT, the PVC-code and the total sum B are output from the first decryption block 55 and input to a separation block 56. In the block 56, the PVC-code and the random number TT are separated from the total sum B, which is output to a block 57 for further transmission to account registers, etc., while the PVC-code and the random number TT are input to a further separation block 58, in which the PVC-code and the random number TT are separated from one another. The PIN-code is provided from the block 55 in an encrypted state and input to a second decryption block 59, in which the encrypted PIN-code is decrypted by employing a decryption key, corresponding to the encryption key $K_1$. The plain text PIN-code is input to a block 60, in which the PIN-code and the PVC-code are combined. As the PVC-code includes a DES (data encryption standard) encryption of the PIN-code, the actual combination of the codes is carried out by employing a DES routine. From the block 60, a PVCV-code is output to a block 61, in which the PVCV-code is compared to PVCV-codes of a file 62, in which PVCV-codes corresponding to authorized or legal cards are stored. Provided the PVCV-code is contained in the PVCV-code file 62, a 'yes' is output to a gate 63, which retransmits the random number TT to the module 50 as the authenticity code verifying the authenticity of the person in possession of the card relative to the card and relative to the on-line verification data system 40, i.e. as a legal and authorized cardholder. Provided the PVCV-code output from the block 60 is not contained in the PVCV-code file 62, the comparison block 61 outputs a 'no' to a gate 64, which outputs a non-authenticity code. The code, i.e. the authenticity code or non-authenticity code transmitted from the data system 40 is compared to the random number TT generated by the random number generator 53 in a comparator block 77 of the security module 50. The result of the comparison in the comparator block 77 is output to an output terminal 78 which is further connected to the display 44 of the apparatus 10 through an appropriate interface.

Now returning to FIG. 3, the upper part of the right-hand side thereof is a flow-diagram illustrating the above on-line verification of the data system 40. As the data system 40 communicates with a great number of terminals or apparatuses corresponding to the apparatus 10 and the apparatus 49, the first decryption block 55 further communicates with a key file 65 including the individual keys corresponding to the individual encryption keys of the individual apparatuses. In FIG. 3, the gates 63 and 64, also shown in FIG. 7, are included in an output block 66, the output of which is connected to the data transmission network 30 for supplying the authenticity or the non-authenticity code to the apparatus 10, and which receives a 'yes' or 'no' from the comparison block 61, together with the random number TT derived from the separation block 56. A further output block 67 is included in FIG. 3, which includes the block 57 shown in FIG. 7 and further receives a 'yes' or 'no' from the comparison block 61. The output block 67 communicates with individual external blocks 68, 69, or 70. Each of the blocks 68–70 may be a bank computer system, which is addressed from the output block 67. Alternatively, one of the blocks may be a computer system owned by a credit card issuing organisation such as the organisation issuing the YY-card 23. Thus, the YY-card is a subsidiary of the high secrecy and high security, on-line data system 40, which actually carries out the verification of the authenticity of the person in possession of the YY-card 23 relative to the card, and, consequently, relative to the credit card issuing organisation.

Figure 4:
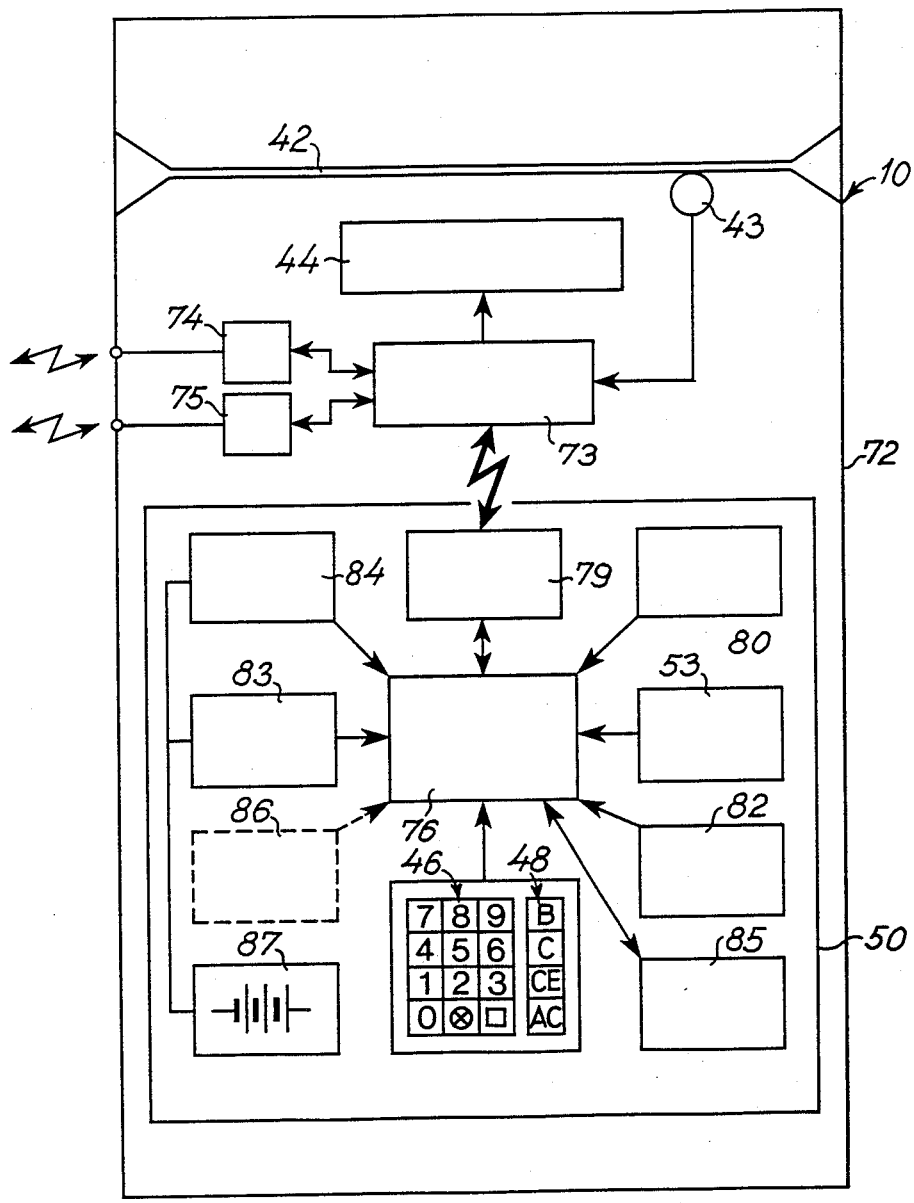
FIG. 4 is a diagrammatical view of the preferred embodiment of an apparatus according to the invention.

In FIG. 4, a general, schematical view of the apparatus 10 according to the invention is shown. The apparatus 10 is housed in a solid line block 72. Within the block 72, the above mentioned security module housing 50 is arranged. In FIG. 4, the above card receiving slot 42 is shown, and a magnetic head assembly 43 is arranged close to the slot so that the magnetic head assembly is brought into close contact with the magnetic strip of the card, i.e. one of the cards 21-24, when the card is moved through the slot 42. The magnetic head assembly 43 outputs signals to a first microprocessor 73, which controls the external functions of the apparatus as will be evident from the description below.

The first microprocessor 73 is further connected to the display 44 which serves the purpose of disclosing the total sum received from the cash register 14 or from the back office computer 18, and of disclosing the result of the off-line verification, or alternatively, the on-line verification of the authenticity of the person in possession of the card relative to the card and, consequently, relative to the off-line data system and the on-line data system, respectively. The first microprocessor 73 is further connected to and communicates with a first and a second output/input means 74 and 75, respectively, communicating with the on-line and the off-line data systems, respectively, i.e. the data system 40 and the back office computer 18 or the cash register 14, respectively.

Centrally within the security module 50, a second microprocessor 76 is arranged, which communicates with the first microprocessor 73 through an interface 79. Within the security module 50, a circuit 80 includes the DES encryption algorithm. Furthermore, the second microprocessor 76 communicates with the above described random number generator 53, with a PROM (programmably read only memory) 82 including the on-line encryption programme, which has been discussed above with reference to FIG. 7, and a RAM (random access memory) 83, in which the PVC-code read from the data carrying card, i.e. one of the cards 21-24, by means of the magnetic head assembly 43 and the first microprocessor 73 is temporarily stored together with the PIN-code input by the customer by means of the numeric keyboard 46, the random number TT generated by the random number generator 53, and the total sum B input from the cash register 14 or from the back office computer 18 through the second input/output means 75. The security module 50 further comprises a key store or RAM 84 in which the encryption key, involved in the encryption of the PVC-code, a PIN-code, the total sum B and the random number TT, as explained above with reference to FIG. 7, for transmission to the high secrecy and high security on-line verification data system 40 is stored. Furthermore, two PROMs 85 and 86 are included, storing the verification algorithm for off-line verification of the authenticity of the person in possession of the corresponding card relative to the card, e.g. the XX-card 22 or the ZZ-card 24, shown in FIG. 3. The RAMs 83 and 84, which are actually volatile RAMs are powered from an external power supply and further backed up by a battery supply 87. Thus, in case the external power supply is disconnected from the apparatus, the volatile RAMs of the apparatus are supplied from the back-up battery supply 87. However, the back up battery supply 87 is further adapted to erase the RAMs 83 and 84 in case a person tried to intrude into the security module 50, and preferably, through mechanical vibration or shock sensors or light detectors connected to the entire circuitry of the security module so that the circuitry is destroyed by applying overvoltage or voltage of incorrect polarity thereto, in case an intrusion is attempted.

Figure 5:
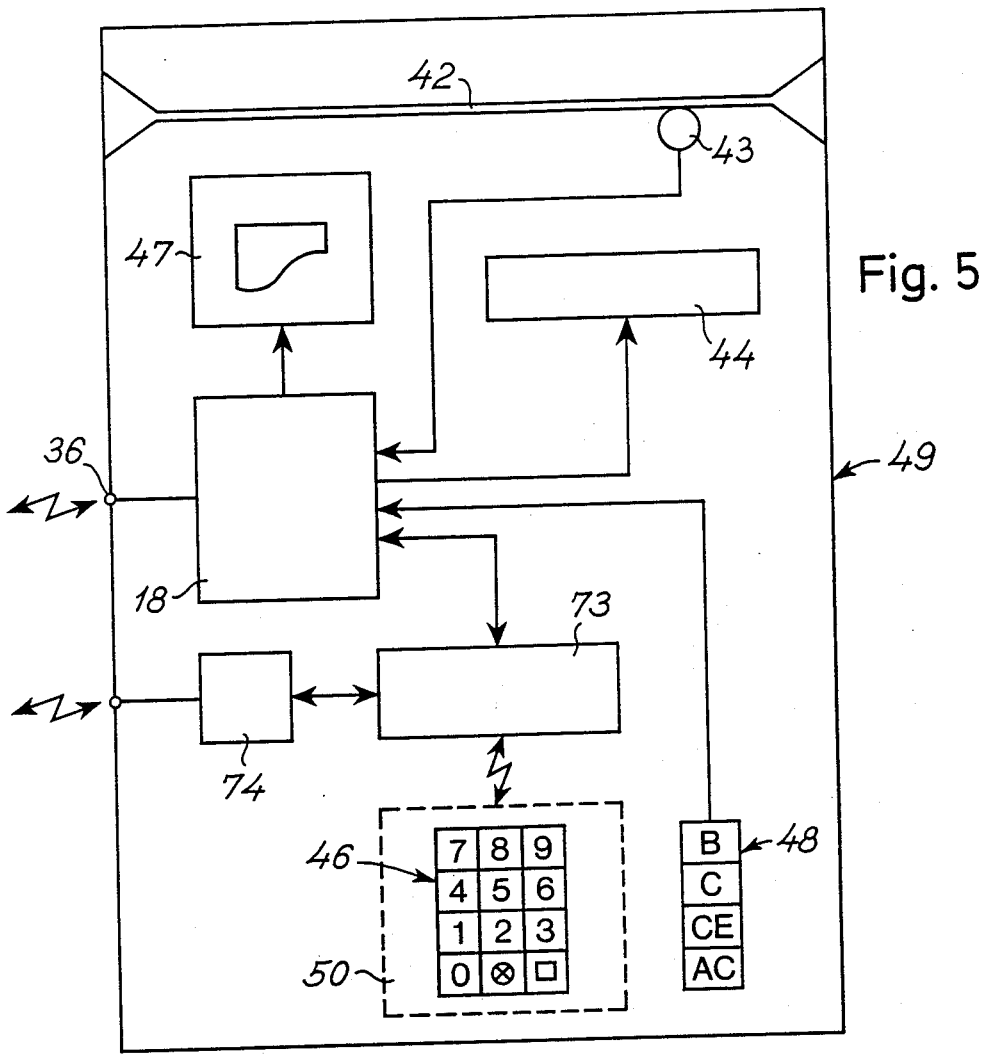
FIG. 5 is a diagrammatical view of an alternative embodiment of an apparatus according to the invention.

In FIG. 5, a general, schematical view of the apparatus 49 according to the invention is shown. Basically, the apparatus 49 comprises the above described security module 50 including the keyboard 46, the keys designated by the reference numeral 48, the first microprocessor 73 which communicates with the high secrecy and the high security on-line data system through the output/input means 74 and further communicates with the back office computer 18 which is also addressable from the above four keys designated by the reference numeral 48. The back office computer 18 further communicates with the display 44, the magnetic head assembly 43 and the receipt printer 47. Whereas in FIG. 4, the data which are read from a card are input directly to the first microprocessor 73, the data are first processed in the back office computer 18 in the apparatus 49 shown in FIG. 5. In case the card is identified by the back office computer 18 as a card belonging to the first data system, the back office computer 18 may process, e.g. offset the data read from the card and present a processed or offset version of the data to the first microprocessor 73 and further to the security module 50. Alternatively, in case the back office computer 18 does not identify the card as a card belonging to the data system itself, i.e. the data system including the back office computer 18, the data which are read from the card are further transferred to the microprocessor 73 and input to the security module 50.

The apparatuses 10 and 49 and the security module 50 thereof function in the following manner. As mentioned above, the data read from the card by means of the magnetic head assembly 43 identify the card as a card belonging to the first data system, i.e. belonging to the high secrecy and high security on-line verification data system 40, as a card belonging to the back office computer system 18, or as a card belonging to neither of the two data systems. Provided the card has been identified by the first microprocessor 73 or by the back office computer 18 as a card belonging to the second data system, the data or the above mentioned offset or processed version thereof are input to the security module 50 from the first microprocessor 73 through the interface 79, further input into the second microprocessor 76, and temporarily stored in the RAM. As explained above, the person in possession of the card is invited to input the PIN-code by means of the numeric keyboard 46, and the PIN-code is output from the numeric keyboard 46 to the second microprocessor 76, and further temporarily stored in the RAM 83. As the first microprocessor 73 has identified the card as a card belonging to the off-line data system 18, the second microprocessor 76 addresses the PROM 85 and carries out an algorithmic comparison of the PIN-code and the data stored in the RAM 83 controlled by the programme stored in the PROM 85 and by employing, if desired, the DES encryption algorithm stored in the store 80. The result of the comparison or the authenticity verification is either a 'yes' or 'no', which is output from the second microprocessor 76 to the interface 79 and input to the first microprocessor 73, which outputs a authenticity or non-authenticity code to the second input/output means 75 to the off-line verification data system shown in FIG. 4 or to the back office computer 18 shown in FIG. 5 and also or further to the display 44 for displaying the result to the person in possession of the card.

Provided the card is identified as a card belonging to the high secrecy and high security data system, i.e. the on-line verification data system 40, the microprocessor 76 addresses the random number generator 53, which outputs a randomly generated number TT to the microprocessor, the randomly generated number TT further being temporarily stored in the RAM 83. In case a number representing the total sum B for the goods etc. to be purchased by the person in possession of the card is input through the second input/output means 75 and further transmitted through the first microprocessor 73 to the interface 79 and output therefrom to the second microprocessor 76 and input to the RAM 83 and stored therein, the PIN-code, the PVC-code, the random number TT and the total sum B are encrypted by the second microprocessor 76, as explained above with reference to FIG. 4, by employing the DES encryption algorithm stored in the store 80 and the key stored in the key store 84 controlled by the encryption programme of the PROM 82. The result of the encryption process is output from the second microprocessor 76 through the interface 79 to the first microprocessor 73 and transmitted therefrom through the first input/output means 74 to the high secrecy and high security on-line verification data system 40, in which the verification of the PIN-code relative to the data is carried out as explained above with reference to FIG. 7. From the on-line verification data system 40, the first input/output means 74 receives the result of the authenticity verification, either the random number TT representing the authenticity code or a non-authenticity code, which is transmitted by the first microprocessor 73 to the interface 79 of the security module 50 and further into the second microprocessor 76. In the second microprocessor 76, the result, i.e. the authenticity code or the non-authenticity code is compared with the random number TT stored in the RAM 83. In case the result of the on-line authenticity verification is the authenticity code, i.e. the random number TT has been retransmitted from the data system 40 to the apparatus 10, the second microprocessor 76 addresses, through the interface 79, the first microprocessor 73 which further displays the result, i.e. the authorization, on the display 44, as shown in FIG. 4, or supplies the result to the back office computer 18, as shown in FIG. 5, which further displays the result on the display 44. In case a non-authenticity code has been transmitted from the data system 40 to the apparatus 10, the second microprocessor 76 reveals, by comparing the code with the random number TT, stored in the RAM 83, that the authenticity verification has resulted in a non-authorization of the person in possession of the card relative to the card. Consequently, the second microprocessor 76 addresses the first microprocessor 73 through the interface 79, and the first microprocessor 73 displays the result, i.e. the non-authorization on the display 44, as shown in FIG. 4, or supplies the result to the back office computer 18, as shown in FIG. 5, which further displays the result on the display 44.

When the first microprocessor 73 provides a displaying of the result of the on-line authenticity verification on the display 44 controlled by the second microprocessor 76 as shown in FIG. 4, or controlled by the back office computer 18, as shown in FIG. 5, the first microprocessor 73 further outputs a respective authenticity or non-authenticity code to the off-line data system, through the second input/output means 75 or through the data transmission line 36, respectively.

It is emphasized that the concept of the present invention renders it impossible to control the apparatus into a mode in which PIN-code is inadvertently or erroneously disclosed in plain text, as the PIN-code is output from the security module 50 in a high secrecy and high security encrypted mode to the high secrecy and high security data system exclusively.

The above mentioned control keys 48, which are shown in FIGS. 4 and 5, are designated B, C, CE and AC, respectively. The customer may operate the keys C, CE and AC after having moved his card through the card receiving slot 42. The key designated CE (abbreviation: 'clear entry') renders it possible for the customer to clear a single digit of the PIN-code while inputting the PIN-code by means of the keyboard 46. The key designated C (abbreviation: 'clear') renders it possible for the customer to clear the PIN-code and any other data temporarily stored in the apparatus, i.e. the data read from the data carrying card, and also the random number generated by the random number generator. The key designated AC (abbreviation: 'accept') is activated by the customer prior to the verification of the customer as the legal cardholder, either on-line or off-line relative to the data system 40 or the back office computer 18, respectively, and after the total sum has been displayed to the customer on the display 44. By activating the key designated AC, the cardholder accepts the total sum displayed on the display 44 to be debited his account after the authorization of the cardholder, either in the bank registers 68, 69 or 70, shown in FIG. 3, or the account in the back office computer 18, shown in FIG. 3. The key designated B (abbreviation: 'balance') may be activated by a person, e.g. the cash register operator or a person in charge of the firm of filling station, in posssion of a balance card after having moved the balance card through the card receiving slot 42 by which the data registered on the balance card are read by the magnetic head assembly 43 and input to the second microprocessor 76 through the first microprocessor 73 and the interface 79, whereupon the apparatus is put into a mode in which the accumulated sums representing the total amount registered by the apparatus and stored within the RAM 83 are output therefrom and output through the microprocessor 76, the interface 79, the microprocessor 73, and the second input/output means 75 to the back office computer system 18.

Figure 1:
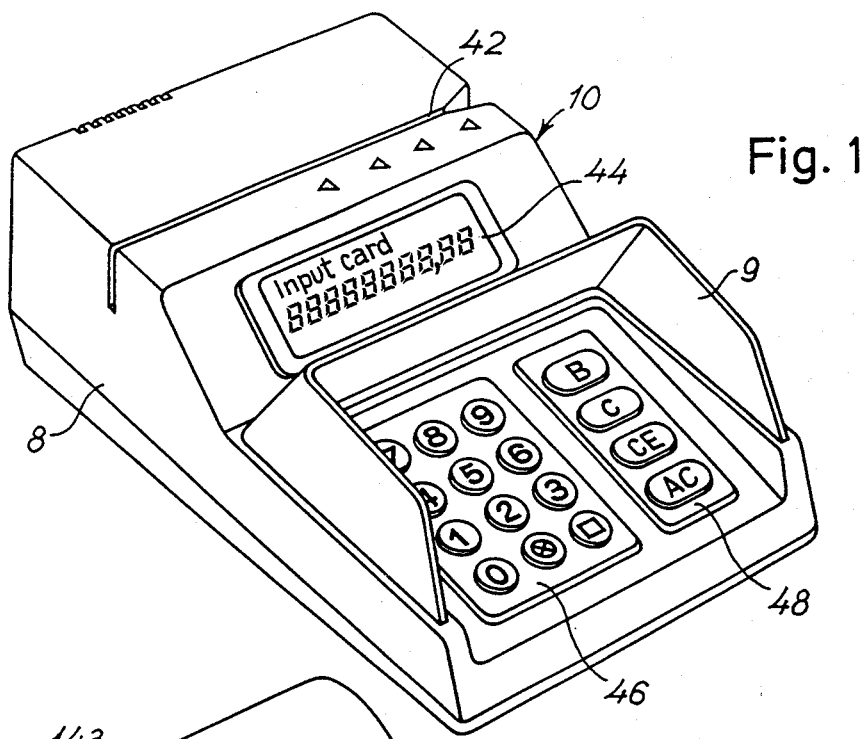
FIG. 1 is an overall, perspective view of a customer operable apparatus constituting the presently preferred embodiment of an apparatus according to the invention and communicating with two different data systems, one of which is a high secrecy and high security data system, and one of which is a low secrecy and low security data system.

In FIG. 1, an overall perspective view of the presently preferred embodiment of the apparatus 10 according to the invention is shown. The apparatus 10 is housed within an outer housing 8 which encases and supports the security module 50. In FIG. 1, the keyboard 46 of the security module 50 is shown together with the four keys designated 48. It is to be mentioned, as is evident from FIGS. 4 and 5, that it is not mandatory to the proper functioning of the apparatus that the keys designated by the reference numeral 48 are arranged within the security module 50, since the functions defined by these four keys under no circumstances influence the non-transparency, high secrecy and high security concept of the present invention. As is evident from FIG. 1, the apparatus 10 comprises an outer housing part 9 which constitutes a shielding means which provides privacy to the customer who operates the keys of the keyboard 46.

Figure 2:
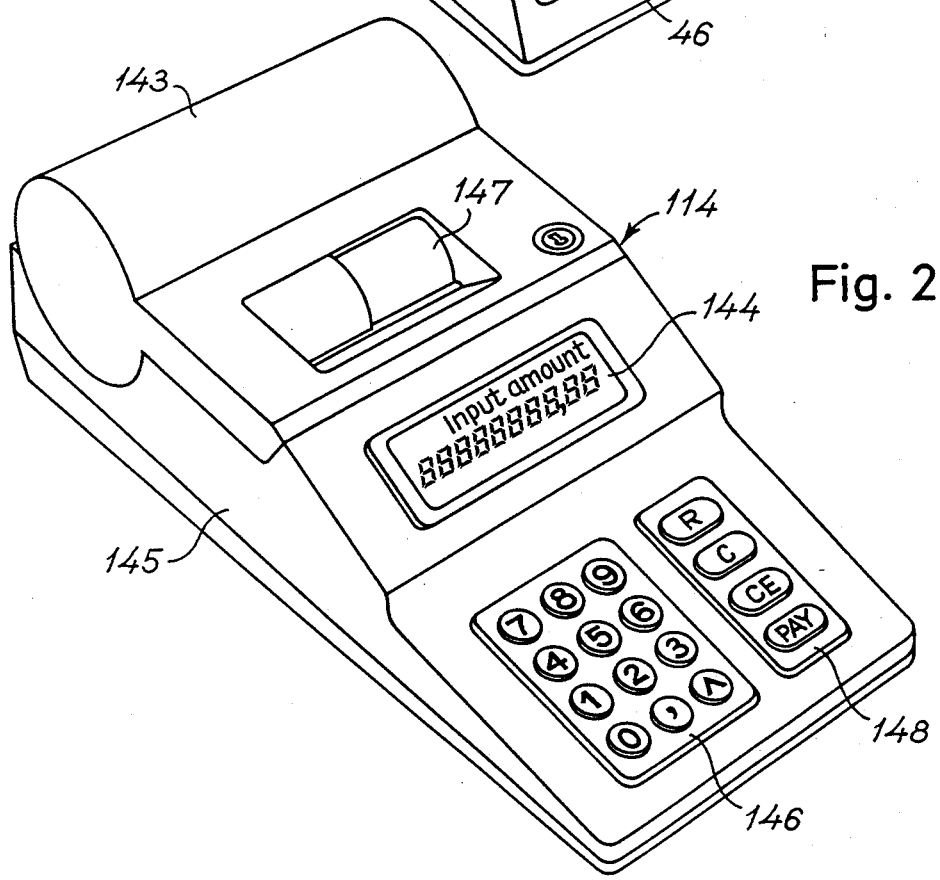
FIG. 2 is an overall, perspective view of an operator operable apparatus communicating with the apparatus of FIG. 1.

In FIG. 2, an apparatus is shown designated the reference numeral 114 in its entity. The apparatus 114 is an amount register apparatus communicating with the apparatus shown in FIG. 1. The amount register apparatus 114 basically constitutes an apparatus corresponding to the cash register 14 shown in the upper part of the left-hand side of FIG. 3 within the broken line block 12. The amount register apparatus 114 is housed within a housing 145 and comprises a display 144, a numeric keyboard 146, function keys 148 and a receipt printer 147. The housing 145 comprises a printer paper reservoir constituted by a housing part 143.

Figure 6:
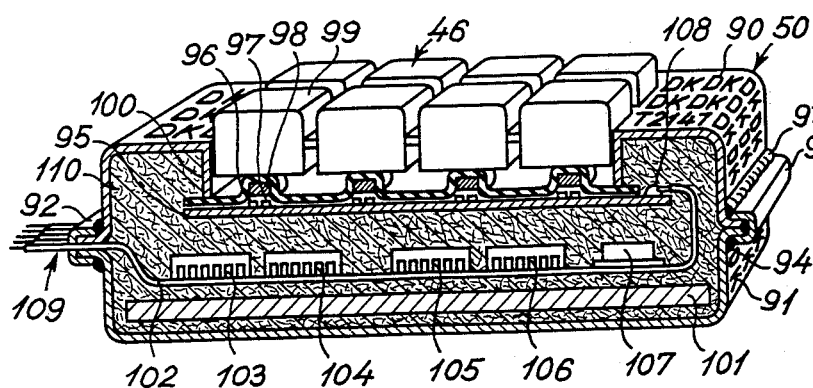
FIG. 6 is a sectional view of a security module of an apparatus according to the invention.

In FIG. 6, a vertical sectional view through an embodiment of the security module 50 is shown, comprising two radiopaque, tamper- and tappingproof housing parts 90 and 91. The housing parts 90 and 91 are preferably made of high-strength stainless steel plate and have identifications etched, engraved or otherwise provided thereon. The two parts 90 and 91 are along their rims totally sealed to one another by means of a sealing part 92, which is welded to the housing parts 90 and 91, as indicated at 93 and 94, respectively. In a down-turned central recess of the housing part 90, which constitutes the top housing part of the security module 50, the keyboard 46 and the control keys 48, shown in FIGS. 1, 3, 4, and 5 are arranged on a supporting printed circuit board 95. Individual contact terminals 96 and 97 arranged on the top surface of the printed circuit board 95 are adapted to be short-circuited by means of a short-circuiting component 98 by depressing a corresponding key 99. The short-circuiting components, e.g. the short-circuiting component 98, cooperating with the terminals 96 and 97 are cast into an elastic, air- and fluid-tight supporting film 100. Within the interiour space defined within the two housing parts 90 and 91, a radiopaque component, such as a plate 101 made of lead, is arranged. On top of the plate 101, however, in insulated relationship therewith, a second printed circuit board 102 is arranged. The printed circuit board 102 supports electronic components, such as electronic components 103-107, implementing the embodiment of the security module shown diagrammatically in FIGS. 1, 3, 4, 5 and 7. The individual track of the printed circuit board 102 are through soldered joints, such as a soldered joint 108, connected to respective tracks of the printed circuit board 95 communicating with respective terminals, e.g. the terminals 96 and 97, thereof. In the left-hand side of FIG. 6, the printed circuit board 102 is confined between the housing parts 91 and 92 and led through an aperture of the sealing part 92 as indicated by the reference numeral 109. The lead-through connection of the printed circuit board 102 serves the purpose of connecting the security module 50 to the remaining components of the apparatus 10, i.e. to supply power to the electronic components thereof, e.g. the electronic components, and of providing access to and from the interface 79, shown in FIG. 4, of the security module 50. The interiour space defined within the housing parts 90 and 91 and between the printed circuit boards 95 and 102 and the radiopaque component or plate 101 is filled with a casting 110 of a high-strength epoxy resin, which secures the circuit boards and the radiopaque component and further includes metallic strips or wires. The metallic strips or wires contained within the epoxy resin casting 110 serves the purpose of ruining the electronic circuit and erasing the data and the key of the RAMs 83 and 84 as described above in case it is attempted to open the security module 50 by mechanical means. The stainless steel housing comprising the housing parts 90 and 91, the plate 101, and the metallic strips and wires contained in the casting 110 provides a module which further eliminates the possibility of revealing details of the apparatus regarding the construction or the functions thereof by exposing the apparatus to radiomagnetic radiation, especially X-rays or by tapping the module by means of highly sensitive electronic listening equipment, as the module is a magnetically and electrically shielded and radiopaque module.

The electronic implementation of the apparatus according to the invention may be realized in several ways obvious to a worker skilled in the art, as the electronic components such as the microprocessors 73 and 76, the PROMs 82, 85 and 86, the RAMS 83 and 84, the random number generator 53, the DES circuit 80, very easily may be purchased from a great number of manufacturers. The programming of the PROMs and of the microprocessor means may also very easily be carried out by the worker skilled in the art.

EXAMPLE

In a design draft implementation or embodiment of the apparatus discussed above the microprocessors 73 and 76 were constituted by electronic circuits of the type 8080 supplied from the company Intel Corporation, the PROMs 82, 85 and 86 were constituted by electronic circuits of the type HN 462716 G supplied from the company Hitachi, the RAMs 83 and 84 were constituted by electronic circuits of the type 2114 L-2 supplied from the company Signetics, the random number generator 53 was provided as software within the microprocessor 76, the interface 79 was constituted by an electronic circuit of the type Z-80A SIO/2 supplied from the company Zilog, and the battery or back-up power supply 87 was constituted by a lithium battery package. The DES encryption circuit 80 was constituted by a 8294 data encryption unit supplied from the company Intel Corporation.

Although the invention has been described above with reference to the drawing, the invention is not limited to the embodiments shown thereon. Thus, although the invention has been described in an embodiment in which the encryption is carried out by means of a DES algorithm, any other high secrecy and high security guaranteeing encrypting algorithm may be employed, e.g. a public key algorithm. Furthermore, the off-line verification may be carried out by employing or by not employing encryption of the data and the code to be compared. Furthermore, the data read from the card or originating from the data read from the card may be verified in relation to the PIN-code input by means of the keyboard of the security module in plain text, i.e. directly, by employing the verification algorithm stored in the PROMs or, as mentioned above, in any processed or offset version of the data read from the card. Furthermore, the security module shown in FIG. 4, may be modified in that several input/output means corresponding to the input/output means designated 74 and 75 may be provided communicating with respective high secrecy and high security on-line, verification data systems and low secrecy and low security, off-line verification data systems. In this realization of the invention, the coherent set of PIN-code and PVC-code is output to the high secrecy and high security data systems exclusively in a high secrecy and high security encrypted state controlled by respective high secrecy and high security encryption algorithms, keys and programmes, while an authenticity or a non-authenticity code is output to the low secrecy and low security data systems exclusively, and the PIN-code input by means of the keyboard or a coherent set of data read from or originating from the data read from the card and the PIN-code are under no circumstances disclosed to the low secrecy and low security data systems.

I claim:

1. A financial transaction terminal for use with a data carrying card, comprising:

communication means for communication with first and second mutually exclusive data systems;

card data input means for receiving data originating from said data carrying card and for receiving a card identification signal positively identifying said card as a card belonging to said first data system or, alternatively, as a card belonging to said second data system;

pesonal code input means for input of a personal authentication code;

first storage means for storing an encryption algorithm and a transmission protocol corresponding to said first data system;

encryption means, connected to said card data input means, said personal code input means, said first storage means and said communication means, for encrypting said data and said code by employing said encryption algorithm stored in said first storage means, provided said card is positively identified as a card belonging to said first data system by employing said card identification signal, and for outputting said data and said code in encrypted form through said communication means to said first data system controlled by said transmission protocol stored in said first storage means for on-line verification of said data relative to said code by said first data system;

second storage means for storing a verification algorithm corresponding to said second data system; and comparator means, connected to said card data input means, said personal code input means, said second storage means and said communication means, for comparing said data and said code by employing said verification algorithm stored in said second storage means, for off-line verification of the authenticity of a person in possession of said card relative to said second data system, provided said card is positively identified as a card belonging to said second data system by employing said card identification signal, and for outputting an authenticity code through said communication means to said second data system in case said data are verified relative to said code by employing said verification algorithm stored in said second storage means, such that said data and said code are not disclosed to said second data system.

2. The terminal according to claim 1 wherein said comparator means alternatively operates for outputting a non-authenticity code through said communication means to said second data system in case said data are not verified relative to said code by employing said verification algorithm stored in said second storage means such that said data and said code are not disclosed to said second data system.

3. A financial transaction terminal for use with a data carrying card, comprising:

card data input means for receiving data originating from said data carrying card and for receiving a card identification signal positively identifying said card as a card belonging to said first data system or, alternatively, as a card belonging to said second data system;

personal code input means for input of a personal authentication code;

first storage means for storing an encryption algorithm and a transmission protocol corresponding to said first data system;

first communication means for communication with a first data system;

encryption means, connected to said card data input means, said personal code input means, said first storage means and said first communication means, for encrypting said data and said code by employing said encryption algorithm stored in said first storage means, provided said card is positively identified as a card belonging to said first data system by employing said card identification signal, and for outputting said data and said code in encrypted form through said first communication means to said first data system controlled by said transmission protocol stored in said first storage means for on-line verification of said data relative to said code by said first data system;

second storage means for storing a verification algorithm corresponding to said second data system;

second communication means for communication with a second data system, said first and second data systems being mutually exclusive; and comparator means, connected to said card data input means, said personal code input means, said second storage means and said second communication means, for comparing said data and said code by employing said verification algorithm stored in said second storage means, for off-line verification of the authenticity of a person in possession of said card relative to said second data system, provided said card is positively identified as a card belonging to said second data system by employing said card identification signal, and for outputting an authenticity code through said second communication means to said second data system in case said data are verified relative to said code by employing said verification algorithm stored in said second storage means or, alternatively, for outputting a non-authenticity code through said second communication means to said second data system in case said data are not verified relative to said code by employing said verification algorithm stored in said second storage means, such that said data and said code are not disclosed to said second data system.

4. A financial transaction terminal for use with a data carrying card, comprising:

communication means for communication with first and second mutually exclusive data systems;

card data input means for receiving data originating from said data carrying card and for receiving a card identification signal positively identifying said card as a card belonging to said first data system or, alternatively, as a card belonging to said second data system;

personal code input means for input of a personal authentication code;

first storage means for storing an encryption algorithm and a transmission protocol corresponding to said first data system;

encryption means, connected to said card data input means, said personal code input means, said first storage means and said communication means, for encrypting said data and said code by employing said encryption algorithm stored in said first storage means, provided said card is positively identified as a card belonging to said first data system by employing said card identification signal, and for outputting said data and said code in encrypted form through said communication means to said first data system controlled by said transmission protocol stored in said first storage means for on-line verification of said data relative to said code by said first data system;

second storage means for storing a verification algorithm corresponding to said second data system; and comparator means, connected to said card data input means, said personal code means, said second storage means and said communication means, for comparing said data and said code by employing said verification algorithm stored in said second storage means, for off-line verification of the authenticity of a person in possession of said card relative to said second data system, provided said card is positively identified as a card belonging to said second data system by employing said card identification signal, and for outputting an authenticity code through said communication means to said second data system in case said data are verified relative to said code by employing said verification algorithm stored in said second storage means or, alternatively, for outputting a non-authenticity code through said communication means to said second data system in case said data are not verified relative to said code by employing said verification algorithm stored in said second storage means, said authenticity code and said non-authenticity code being of structures not including said data and said code such that said data and said code are not disclosed to said second data system.

5. A financial transaction terminal for use with a data carrying card, comprising:

communication means for communication with first and second mutually exclusive data systems;

card data input means for receiving data originating from said data carrying card and for receiving a card identification signal positively identifying said card as a card belonging to said first data system or, alternatively, as a card belonging to said second data system;

personal code input means for input of a personal authentication code;

first storage means for storing a first encryption algorithm and a transmission protocol corresponding to said first data system;

first encryption means, connected to said card data input means, said personal code input means, said first storage means and said communication means, for encrypting said data and said code by employing said first encryption algorithm stored in said first storage means, provided said card is positively identified as a card belonging to said first data system by employing said card identification signal, and for outputting said data and said code in encrypted form through said communication means to said first data system controlled by said transmission protocol stored in said first storage means for on-line verification of said data relative to said code by said first data system;

second storage means for storing a second encryption algorithm and a verification algorithm corresponding to said second data system;

second encryption means connected to said card data input means, said personal code input means, said second storage means and said communication means, for encrypting said data and said code by employing said second encryption algorithm stored in said second storage means, provided said card is positively identified as a card belonging to said second data system by employing said card identification signal; and comparator means, connected to said second encryption means, said second storage means and said communication means, for comparing said data and said code in encrypted form supplied from said second encryption means by employing said verification algorithm stored in said second storage means, for off-line verification of the authenticity of a person in possession of said card relative to said second data system, provided said card is positively identified as a card belonging to said second data system by employing said card identification signal, and for outputting an authenticity code through said communication means to said second data system in case said data are verified relative to said code by employing said verification algorithm stored in said second storage means or, alternatively, for outputting a non-authenticity code through said communication means to said second data system in case said data are not verified relative to said code by employing said verification algorithm stored in said second storage means, such that said data and said code are not disclosed to said second data system.

6. The terminal according to claim 5, said first and second encryption means being constituted by a single encryption means.

7. A financial transaction terminal for use with a data carrying card, comprising:

communication means for communication with first and second mutually exclusive data systems;

card data input means for receiving data originating from said data carrying card and for generating a card identification signal positively identifying said card as a card belonging to said first data system, as a card belonging to said second data system or as a card belonging to neither of said data systems;

personal code input means for input of a personal authentication code;

first storage means for storing an encryption algorithm and a transmission protocol corresponding to said first data system;

encryption means, connected to said card data input means, said personal code input means, said first storage means and said communication means, for encrypting said data and said code by employing said encryption algorithm stored in said first storage means, provided said card is positively identified as a card belonging to said first data system by employing said card identification signal, and for outputting said data and said code in encrypted form through said communication means to said first data system controlled by said transmission protocol stored in said first storage means for on-line verification of said data relative to said code by said first data system;

second storage means for storing a verification algorithm corresponding to said second data system; and comparator means, connected to said card data input means, said personal code means, said second storage means and said communication means, for comparing said data and said code by employing said verification algorithm stored in said second storage means, for off-line verification of the authenticity of a person in possession of said card relative to said second data system, provided said card is positively identified as a card belonging to said second data system by employing said card identification signal, and for outputting an authenticity code through said communication means to said second data system in case said data are verified relative to said code by employing said verification algorithm stored in said second storage means, such that said data and said code are not disclosed to said second data system.

8. The terminal according to claim 7 wherein said comparator means alternatively operates for outputting a non-authenticity code through said communication means to said second data system in case said data are not verified relative to said code by employing said verification algorithm stored in said second storage means, such that said data and said code are not disclosed to said second data system.

9. A financial transaction terminal for use with a data carrying card, comprising:

communication means for communication with first and second mutually exclusive data systems;

card reading means for reading data from said data carrying card;

card data input means for receiving said data from said card reading means and for generating a card identification signal positively identifying said card as a card belonging to said first data system, as a card belonging to said second data system or as a card belonging to neither of said data systems;

personal code input means for input of a personal authentication code;

temporary storage means for temporarily storing said data and said code;

first storage means for storing an encryption algorithm and a transmission protocol corresponding to said first data system;

encryption means, connected to said card data input means, said temporary storage means, said first storage means and said communication means, for encrypting said data and said code stored in said temporary storage means by employing said encryption algorithm stored in said first storage means, provided said card is positively identified as a card belonging to said first data system by employing said card identification signal, and for outputting said data and said code in encrypted form through said communication means to said first data system controlled by said transmission protocol stored in said first storage means for on-line verification of said data relative to said code by said first data system;

data receiving means connected to said first data system through said communication means, for receiving a verification code or, alternatively, a non-verification code from said first data system as a result of said on-line verification, second storage means for storing a verification algorithm corresponding to said second data system; and comparator means, connected to said card data input means, said temporary storage means, said second storage means and said communication means, for comparing said data and said code by employing said verification algorithm stored in said second storage means, for off-line verification of the authenticity of a person in possession of said card relative to said second data system, provided said card is positively identified as a card belonging to said second data system by employing said card identification signal, and for outputting an authenticity code through said communication means to said second data system in case said data are verified relative to said code by employing said verification algorithm stored in said second storage means or, alternatively, for outputting a non-authenticity code through said communication means to said second data system in case said data are not verified relative to said code by employing said verification algorithm stored in said second storage means, such that said data and said code are not disclosed to said second data system.

10. A financial transaction terminal for use with a data carrying card, comprising:

communication means for communication with first and second mutually exclusive data systems;

card reading means for reading data from said data carrying card;

card data input means for receiving said data from said card reading means and for generating a card identification signal positively identifying said card as a card belonging to said first data system, as a card belonging to said second data system or as a card belonging to neither of said data systems;

personal code input means for input of a personal authentication code;

random number generating means for generating a random number, temporary storage means for temporarily storing said data, said code and said random number generated by said random number generating means;

first storage means for storing an encryption algorithm and a transmission protocol corresponding to said first data system;

encryption means, connected to said card data input means, said temporary storage means, said first storage means and said communication means, for encrypting said data, said code and said random number stored in said temporary storage means by employing said encryption algorithm stored in said first storage means, provided said card is positively identified as a card belonging to said first data system by employing said card identification signal, and for outputting said data, said code and said random number in encrypted form through said communication means to said first data system controlled by said transmission protocol stored in said first storage means for on-line verification of said data relative to said code by said first data system;

data receiving means connected to said first data system through said communication means, for receiving a result code from said first data system representing a result of said on-line verification;

first comparator means for comparing said result code and said random number stored in said temporary storage means for identifying said person in possession of said card as an authenticity verified person relative to said first data system when said result code and said random number are identical to one another or, alternatively, as a non-authenticity verified person relative to said first data system when said result code and said random number are different from one another;

second storage means for storing a verification algorithm corresponding to said second data system; and second comparator means, connected to said card data input means, said personal code means, said second storage means and said communication means, for comparing said data and said code by employing said verification algorithm stored in said second storage means, for off-line verification of the authenticity of a person in possession of said card relative to said second data system, provided said card is positively identified as a card belonging to said second data system by employing said card identification signal, and for outputting an authenticity code through said communication means to said second data system in case said data are verified relative to said code by employing said verification algorithm stored in said second storage means or, alternatively, for outputting a non-authenticity code through said communication means to said second data system in case said data are not verified relative to said code by employing said verification algorithm stored in said second storage means, such that said data and said code are not disclosed to said second data system.

11. A financial transaction terminal for use with a data carrying card, comprising:

communication means for communication with first and second mutually exclusive data systems;

card data input means for receiving data originating from said data carrying card and for receiving a card identification signal positively identifying said card as a card belonging to said first data system or, alternatively, as a card belonging to said second data system;

personal code input means for input of a personal authentication code;

first storage means for storing an encryption algorithm and a transmission protocol corresponding to said first data system;

encryption means, connected to said card data input means, said personal code input means, said first storage means and said communication means, for encrypting said data and said code by employing said encryption algorithm stored in said first storage means, provided said card is positively identified as a card belonging to said first data system by employing said card identification signal, and for outputting said data and said code in encrypted form through said communication means to said first data system controlled by said transmission protocol stored in said first storage means for on-line verification of said data relative to said code by said first data system;

second storage means for storing a verification algorithm corresponding to said second data system;

comparator means, connected to said card data input means, said personal code means, said second storage means and said communication means, for comparing said data and said code by employing said verification algorithm stored in said second storage means, for off-line verification of the authenticity of a person in possession of said card relative to said second data system, provided said card is positively identified as a card belonging to said second data system by employing said card identification signal, and for outputting an authenticity code through said communication means to said second data system in case said data are verified relative to said code by employing said verification algorithm stored in said second storage means or, alternatively, for outputting a non-authenticity code through said communication means to said second data system in case said data are not verified relative to said code by employing said verification algorithm stored in said second storage means, such that said data and said code are not disclosed to said second data system; and a radiopaque, tamper- and tapping-proof housing enclosing at least said card data input means, said personal code input means, said first and second storage means, said encryption means, and said comparator means.

12. A method of communicating with at least two mutually exclusive data systems for use with a data carrying card, comprising the steps of:

(a) receiving data originating from the data carrying card;

(b) inputting a personal authentication code;

(c) identifying the card on the basis of said data received from the card, as a card belonging only to a first data system, as a card belonging only to a second data system, or as a card belonging to neither of said data systems;

(d) encrypting said data and said code if the card is identified as a card belonging to said first data system;

(e) outputting said encrypted data and said encrypted code to said first data system controlled by a transmission protocol if the card is identified as a card belonging to said first data system;

(f) comparing said data and said code if the card is identified as a card belonging to said second data system;

(g) producing an authenticity code if said data is verified relative to said code by employing a verification algorithm;

(h) outputting said authenticity code if the card is identified as a card belonging to said second data system such that said data and code are not disclosed to said second data system.

* * * * *

UNITED STATES PATENT AND TRADEMARK OFFICE
CERTIFICATE OF CORRECTION

PATENT NO. : 4,882,779
DATED : November 21, 1989
INVENTOR(S) : Preben Rahtgen

It is certified that error appears in the above-identified patent and that said Letters Patent is hereby corrected as shown below:

Title page:

In the Abstract, line 20, change "employed" to --employing--.

In column 1, line 62, change "automatied" to --automated--.

In column 6, line 39, change "bieng" to --being--.

In column 7, line 17, change "communcating" to --communicating--.

In column 7, line 51, change "apparus" to --apparatus--.

In column 9, line 16, change "strengh" to --strength--.

In column 13, line 51, delete "an" (second occurrence).

In column 15, line 29, after "illustrates" insert --the--.

In column 20, line 40, change "of" (second occurrence) to --or--.

In column 20, line 41, change "posssion" to --possession--.

Signed and Sealed this

Ninth Day of April, 1991

Attest:

HARRY F. MANBECK, JR.

*Attesting Officer*  *Commissioner of Patents and Trademarks*